United States Patent
Sung et al.

(10) Patent No.: US 9,885,381 B2
(45) Date of Patent: Feb. 6, 2018

(54) EXTRUSION-TYPE CONNECTING ROD, EXTRUSION APPARATUS FOR CONNECTING ROD AND MANUFACTURING METHOD FOR EXTRUSION-TYPE CONNECTING ROD

(71) Applicant: KOREA AUTOMOTIVE TECHNOLOGY INSTITUTE, Cheonan-si, Chungcheongnam-do (KR)

(72) Inventors: Si Young Sung, Cheonan-si (KR); Beom Suck Han, Suwon-si (KR); Won Kyu Park, Chungcheongnam-do (KR)

(73) Assignee: KOREA AUTOMOTIVE TECHNOLOGY INSTITUTE, Cheonan-si (KR)

( * ) Notice: Subject to any disclaimer, the term of this patent is extended or adjusted under 35 U.S.C. 154(b) by 154 days.

(21) Appl. No.: 14/782,228

(22) PCT Filed: Apr. 4, 2014

(86) PCT No.: PCT/KR2014/002923
§ 371 (c)(1),
(2) Date: Jan. 15, 2016

(87) PCT Pub. No.: WO2014/163428
PCT Pub. Date: Oct. 9, 2014

(65) Prior Publication Data
US 2016/0123382 A1    May 5, 2016

(30) Foreign Application Priority Data
Apr. 5, 2013 (KR) .................. 10-2013-0037768

(51) Int. Cl.
*B21C 23/21* (2006.01)
*F16C 7/02* (2006.01)
*B21C 23/14* (2006.01)

(52) U.S. Cl.
CPC ............ *F16C 7/023* (2013.01); *B21C 23/142* (2013.01); *F16C 2220/48* (2013.01)

(58) Field of Classification Search
CPC ........................... B21C 23/142; B21C 23/002
See application file for complete search history.

(56) References Cited

FOREIGN PATENT DOCUMENTS

JP           61132262 A  *  6/1986
JP           04327315 A  * 11/1992
(Continued)

*Primary Examiner* — Vicky A Johnson
(74) *Attorney, Agent, or Firm* — Sang Ho Lee; Novick, Kim & Lee, PLLC

(57) ABSTRACT

The present invention relates to an extrusion-type connecting rod which is installed between a piston and a crank and can convert the reciprocating motion of the piston into the rotary motion of a crank shaft, an extrusion apparatus for a connecting rod, and a manufacturing method for the extrusion-type connecting rod. The extrusion-type connecting rod may comprise: a first big end having a portion of a crank shaft hole formed on one side and having a seam-line divided surface, which comprises a seam line formed at the time of extrusion, formed on the other side; a second big end, being extrusion-molded simultaneously with the first big end, having the other portion of the crank shaft hole formed on one side, and having a seam-line divided surface, which comprises a seam line formed at the time of extrusion, formed so as to contact the seam-line divided surface of the first big end; a connection part which is extrusion-molded integrally with the second big end; and a small end which is extrusion-molded integrally with the connection part.

4 Claims, 6 Drawing Sheets

(56) References Cited

FOREIGN PATENT DOCUMENTS

| JP | 07-100576 A | | 4/1995 | |
|---|---|---|---|---|
| JP | 07100576 A | * | 4/1995 | .............. B21J 5/002 |
| KR | 10-2001-0097861 A | | 11/2001 | |
| KR | 10-0669942 B1 | | 1/2007 | |

* cited by examiner

EXTRUSION-TYPE CONNECTING ROD, EXTRUSION APPARATUS FOR CONNECTING ROD AND MANUFACTURING METHOD FOR EXTRUSION-TYPE CONNECTING ROD

TECHNICAL FIELD

The present invention relates to an extrusion-type connecting rod, a connecting rod extrusion apparatus, and a method of manufacturing the extrusion-type connecting rod and, more particularly, to an extrusion-type connecting rod provided between a piston and a crank to convert reciprocating motion of the piston into rotary motion of a crankshaft, a connecting rod extrusion apparatus, and a method of manufacturing the extrusion-type connecting rod.

BACKGROUND

In general, a connecting rod is a mechanical element provided between a piston and a crank to convert reciprocating motion into rotary motion, and may include a big end connected to a crankshaft, a small end connected to a piston shaft, and a connection part for interconnecting the big and small ends.

The connecting rod mostly uses an iron-based alloy having excellent toughness and fatigue resistance against repeated explosions of the piston, and is manufactured using casting, forging, or sintered powder molding.

However, since the connecting rod manufactured using casting, forging, or sintered powder molding is not easily producible in a large quantity due to processing characteristics thereof, productivity is low, economic feasibility is low, and products are high-priced and heavy-weighted, and have a high defect rate due to structural detects, porosity defect, etc. thereof.

To solve the above problem, KR 2001-0097861 discloses a method of manufacturing a connecting rod using an extrusion die.

However, according to the connecting rod manufactured using the above conventional technology, a big end should be cut using a cutting device to interconnect a crankshaft and the big end. As such, manufacturing costs and manufacturing time of products are increased, productivity is lowered, and prices of the products are increased.

DETAILED DESCRIPTION OF THE INVENTION

Technical Problem

The present invention provides an extrusion-type connecting rod capable of being extrusion-molded in a large quantity using a lightweight material such as high-strength aluminum to improve productivity and economic feasibility, of reducing product weights, of producing high-quality products having no defects made in an extrusion process for applying a high strength is applied to a molding material, and of easily dividing a big end using easily divisible seam line splitting planes, a connecting rod extrusion apparatus, and a method of manufacturing the extrusion-type connecting rod. However, the scope of the present invention is not limited thereto.

Technical Solution

According to an aspect of the present invention, there is provided an extrusion-type connecting rod including a first big end, wherein a part of a crankshaft hole is provided at one side and a seam line splitting plane including a seam line generated due to extrusion is provided at the other side, a second big end extrusion-molded simultaneously with the first big end, wherein another part of the crankshaft hole is provided at one side and a seam line splitting plane including the seam line generated due to extrusion is provided to contact the seam line splitting plane of the first big end, a connection part extrusion-molded integrally with the second big end, and a small end extrusion-molded integrally with the connection part.

One or more fixture holes screwed by fixtures may be provided in each of the first and second big ends.

A piston pinhole through which a piston pin penetrates may be provided in the small end.

According to another aspect of the present invention, there is provided a connecting rod extrusion apparatus including a front die having one final extrusion hole provided in an external shape of a connecting rod, and a rear die assembled with the front die and including a crankshaft hole generator for generating a crankshaft hole of the connecting rod, one or more bridges provided on the crankshaft hole generator to generate seam line splitting planes based on the crankshaft hole generator, at least one first inlet hole provided in a first direction based on the bridges, and at least one second inlet hole provided in a second direction based on the bridges.

The crankshaft hole generator may protrude to be spaced apart from and partially inserted into the final extrusion hole of the front die.

The connecting rod extrusion apparatus may further include a container assembled with the rear die and having one container hole, and a ram for extruding a molding material accommodated in the container hole, toward the front die.

The connecting rod extrusion apparatus may further include a container assembled with the rear die and including a first container hole connected to the first inlet hole and a second container hole connected to the second inlet hole, a first ram for extruding a first molding material accommodated in the first container hole, toward the front die, and a second ram for extruding a second molding material accommodated in the second container hole, toward the front die.

According to another aspect of the present invention, there is provided a method of manufacturing an extrusion-type connecting rod using a connecting rod extrusion apparatus including a front die having one final extrusion hole provided in an external shape of a connecting rod, and a rear die assembled with the front die and including a crankshaft hole generator for generating a crankshaft hole of the connecting rod, one or more bridges provided on the crankshaft hole generator to generate seam line splitting planes based on the crankshaft hole generator, at least one first inlet hole provided in a first direction based on the bridges, and at least one second inlet hole provided in a second direction based on the bridges, the method including extruding an extrusion base material by penetrating a molding material through the first and second inlet holes and the final extrusion hole, cutting the extrusion base material into an individual connecting rod, and dividing the seam line splitting planes of the cut individual connecting rod.

The method may further include boring fixture holes in the first and second big ends in such a manner that the first and second big ends divided along the seam line splitting planes are assembled with each other, and boring a piston pinhole in the small end.

Advantageous Effects

According to some embodiments of the present invention, an extrusion-type connecting rod may be produced in a large quantity to improve productivity and economic feasibility, product weights may be reduced, high-quality products having no defects may be produced, and a big end may be easily divided to greatly reduce the number of processes or a process time. However, the scope of the present invention is not limited thereto.

MODE OF THE INVENTION

Figure 1:
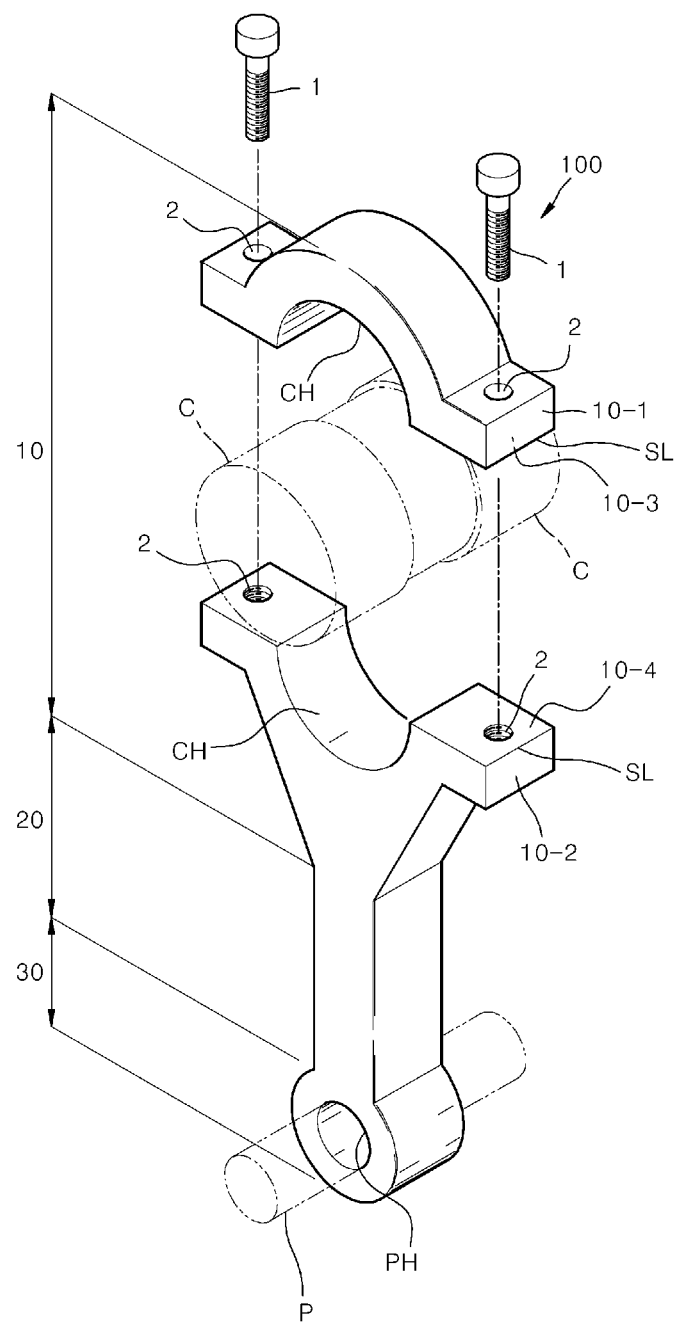
FIG. 1 is an exploded perspective view of an extrusion-type connecting rod according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "above," "upper," "beneath," "below," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "above" may encompass both an orientation of above and below. The device may be otherwise oriented (rotated 90 degrees or at other orientations) and the spatially relative descriptors used herein interpreted accordingly.

The terminology used herein is for the purpose of describing particular embodiments and is not intended to limit the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 2:
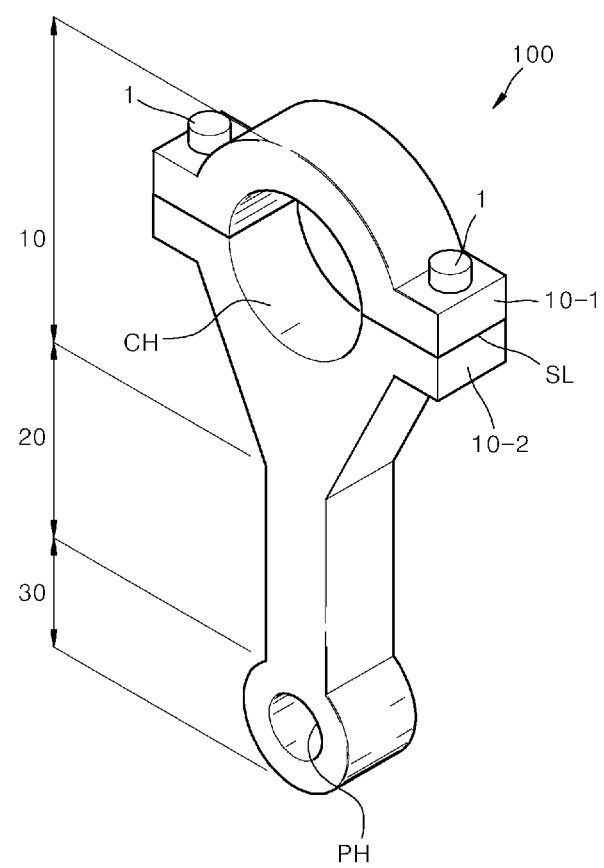
FIG. 2 is an assembled perspective view of FIG. 1.

FIG. 1 is an exploded perspective view of an extrusion-type connecting rod 100 according to some embodiments of the present invention, and FIG. 2 is an assembled perspective view of FIG. 1.

As illustrated in FIGS. 1 and 2, the extrusion-type connecting rod 100 according to some embodiments of the present invention may largely include a big end 10, a connection part 20, and a small end 30.

Herein, the big end 10 may include a first big end 10-1 and a second big end 10-2 which are detachable from each other.

Specifically, the first big end 10-1 may be extrusion-molded in such a manner that an upper part of a crankshaft hole CH into which a crankshaft C marked with a dash-dot-dot line in FIG. 1 is inserted is provided at one side and that a seam line splitting plane 10-3 including a seam line SL generated due to extrusion is provided at the other side.

The second big end 10-2 may be extrusion-molded simultaneously with the first big end 10-1 in such a manner that a lower part of the crankshaft hole CH into which the crankshaft C is inserted is provided at one side, and that a seam line splitting plane 10-4 including the seam line SL generated due to extrusion is provided to contact the seam line splitting plane 10-3 of the first big end 10-1.

Herein, the seam line splitting planes 10-3 and 10-4 are spontaneously generated due to characteristics of an internal die for processing a hole at the center of a product extruded to a pipe shape. In general, when a pipe is extruded, a seam line is easily broken and thus should be additionally welded.

However, according to the present invention, since the seam line SL is used as the splitting planes 10-3 and 10-4 of the connecting rod 100, the first and second big ends 10-1 and 10-2 may be divided based on the seam line SL without an additional cutting process.

One or more fixture holes 2 screwed by fixtures 1 may be provided in each of the first and second big ends 10-1 and 10-2.

Accordingly, as illustrated in FIG. 2, the big end 10 may be assembled by allowing the seam line splitting plane 10-3 of the first big end 10-1 and the seam line splitting plane 10-4 of the second big end 10-2 to surface-contact each other using the fixtures 1.

The connection part 20 may be extrusion-molded integrally with the second big end 10-2 and may interconnect the big end 10 and the small end 30.

The small end 30 may be extrusion-molded integrally with the connection part 20 in such a manner that a piston pinhole PH through which a piston pin P penetrates is provided in the small end 30.

Figure 3:
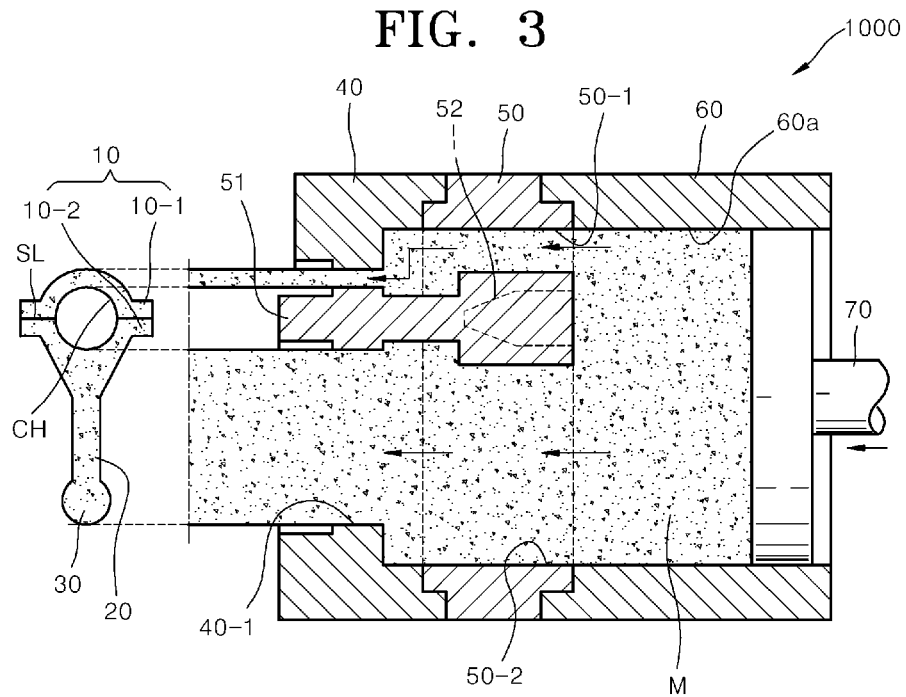
FIG. 3 is a partial cross-sectional view of a connecting rod extrusion apparatus according to some embodiments of the present invention.
Figure 5:
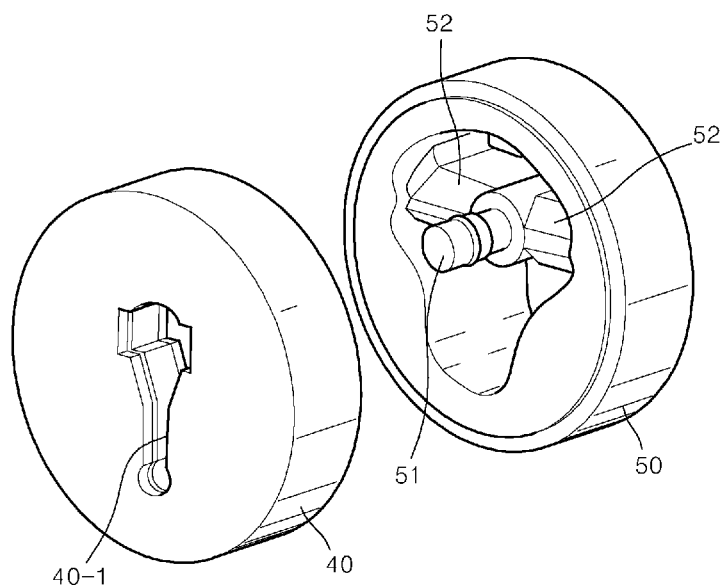
FIG. 5 is a front exploded perspective view of a front die and a rear die of the connecting rod extrusion apparatus of FIG. 3.
Figure 6:
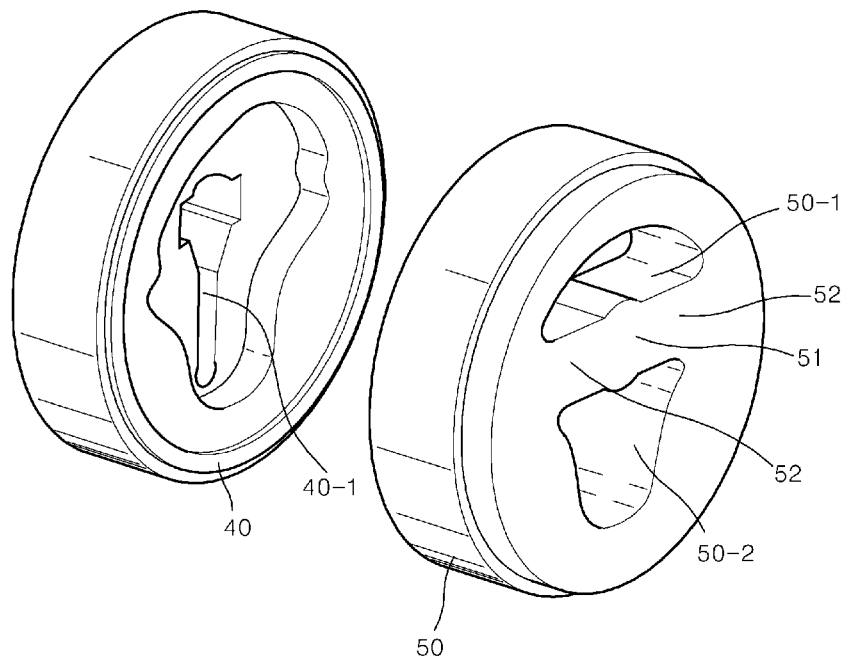
FIG. 6 is a rear exploded perspective view of FIG. 5.

FIG. 3 is a partial cross-sectional view of a connecting rod extrusion apparatus 1000 according to some embodiments of the present invention, FIG. 5 is a front exploded perspective view of a front die 40 and a rear die 50 of the connecting rod extrusion apparatus 1000 of FIG. 3, and FIG. 6 is a rear exploded perspective view of FIG. 5.

As illustrated in FIG. 3, the connecting rod extrusion apparatus 1000 according to some embodiments of the present invention may largely include the front die 40, the rear die 50, a container 60, and a ram 70.

Herein, as illustrated in FIGS. 3, 5, and 6, the front die 40 may be an extrusion die having one final extrusion hole 40-1 provided in an external shape of the connecting rod 100.

As illustrated in FIGS. 3, 5, and 6, the rear die 50 may be assembled with the front die 40 and may be an extrusion die including a crankshaft hole generator 51 for generating the crankshaft hole CH of the connecting rod 100, bridges 52 provided at left and right sides of the crankshaft hole generator 51 to generate the seam line splitting planes 10-3 and 10-4 in the connecting rod 100 based on the crankshaft hole generator 51, a first inlet hole 50-1 provided in an upward direction based on the bridges 52, and a second inlet hole 50-2 provided in a downward direction based on the bridges 52.

Herein, the crankshaft hole generator 51 may protrude to be spaced apart from and partially inserted into the final extrusion hole 40-1 of the front die 40.

As illustrated in FIG. 3, the container 60 is assembled with the rear die 50 and is a kind of cylinder for accommodating a molding material M and having one container hole 60a.

As illustrated in FIG. 3, the ram 70 is a kind of piston device for extruding the molding material M accommodated in the container hole 60a, toward the front die 40.

Figure 7:
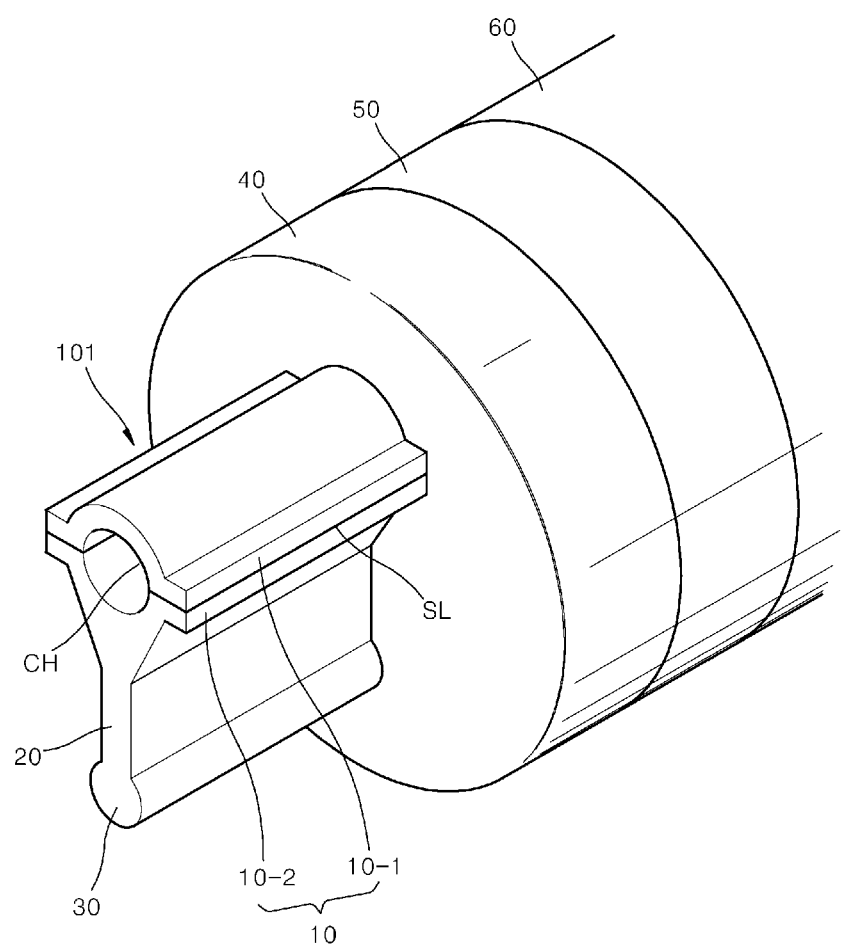
FIG. 7 is an operational perspective view showing an extrusion base material extruded using the connecting rod extrusion apparatus of FIG. 3.

FIG. 7 is an operational perspective view showing an extrusion base material 101 extruded using the connecting rod extrusion apparatus 1000 of FIG. 3.

Accordingly, as illustrated in FIGS. 3 and 7, a detailed description is now given of operation of the connecting rod extrusion apparatus 1000 according to some embodiments of the present invention. If the molding material M, e.g., aluminum, accommodated in the container 60 is pressed using the ram 70, a part of the molding material M may flow through the first inlet hole 50-1 of the rear die 50 to the final extrusion hole 40-1 of the front die 50, and another part of the molding material M may flow through the second inlet hole 50-2 of the rear die 50 to the final extrusion hole 40-1 of the front die 50.

In this case, the part discharged through the first inlet hole 50-1 from the final extrusion hole 40-1 may form the first big end 10-1 of the extrusion base material 101 of FIG. 7, and the part discharged through the second inlet hole 50-2 from the final extrusion hole 40-1 may form the second big end 10-2 of the extrusion base material 101 of FIG. 7.

Herein, the seam line SL which is spontaneously breakable is generated between the first and second big ends 10-1 and 10-2 due to the bridges 52 of the rear die 50, and the seam line splitting plane 10-3 may be generated on the first big end 10-1 and the seam line splitting plane 10-4 may be generated on the second big end 10-2 based on the seam line SL.

As such, if the extrusion base material 101 extruded as described above is cut to equal thicknesses, the extrusion-type connecting rod 100 according to some embodiments of the present invention, which is illustrated in FIGS. 1 and 2, may be easily produced in large quantities.

Figure 4:
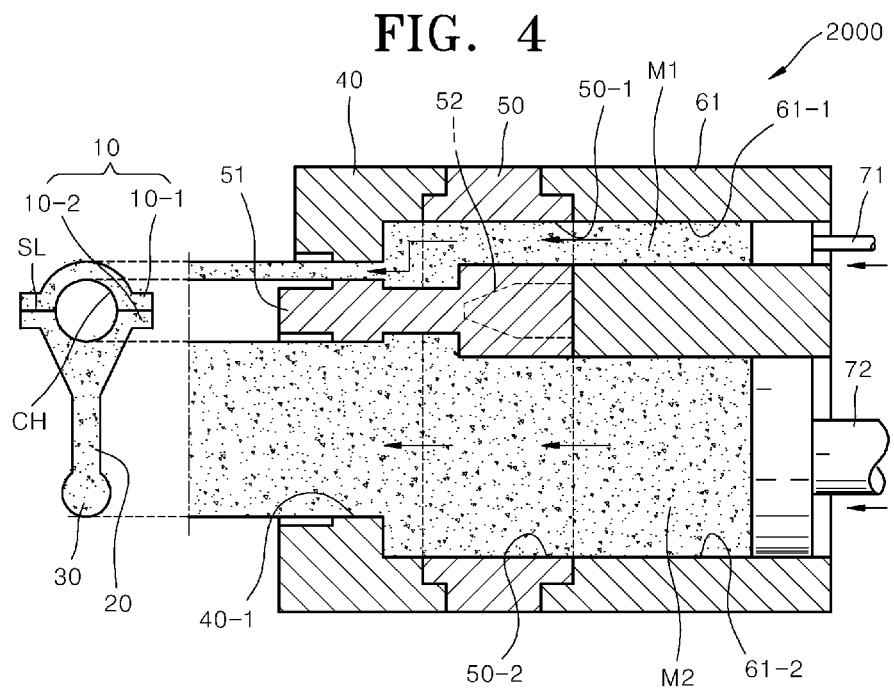
FIG. 4 is a partial cross-sectional view of a connecting rod extrusion apparatus according to other embodiments of the present invention.

FIG. 4 is a partial cross-sectional view of a connecting rod extrusion apparatus 2000 according to other embodiments of the present invention.

As illustrated in FIG. 4, the connecting rod extrusion apparatus 2000 according to other embodiments of the present invention may include a container 61 assembled with the rear die 50 and including a first container hole 61-1 connected to the first inlet hole 50-1 and a second container hole 61-2 connected to the second inlet hole 50-2, a first ram 71 for extruding a first molding material M1 accommodated in the first container hole 61-1, toward the front die 40, and a second ram 72 for extruding a second molding material M2 accommodated in the second container hole 61-2, toward the front die 40.

Accordingly, as illustrated in FIG. 4, a detailed description is now given of operation of the connecting rod extrusion apparatus 2000 according to other embodiments of the present invention. If the first molding material M1, e.g., aluminum, accommodated in the first container hole 61-1 of the container 61 is pressed using the first ram 71, a part of the first molding material M1 may flow through the first inlet hole 50-1 of the rear die 50 to the final extrusion hole 40-1 of the front die 50.

In addition, if the second molding material M2, e.g., aluminum, accommodated in the second container hole 61-2 of the container 61 is pressed using the second ram 72, a part of the second molding material M2 may flow through the second inlet hole 50-2 of the rear die 50 to the final extrusion hole 40-1 of the front die 50.

In this case, the first molding material M1 discharged through the first inlet hole 50-1 from the final extrusion hole 40-1 may form the first big end 10-1 of the extrusion base material 101 of FIG. 7, and the second molding material M2 discharged through the second inlet hole 50-2 from the final extrusion hole 40-1 may form the second big end 10-2 of the extrusion base material 101 of FIG. 7.

Herein, the seam line SL which is spontaneously breakable is generated between the first and second big ends 10-1 and 10-2 due to the bridges 52 of the rear die 50, and the seam line splitting plane 10-3 may be generated on the first big end 10-1 and the seam line splitting plane 10-4 may be generated on the second big end 10-2 based on the seam line SL.

In this case, the first and second molding materials M1 and M2 may be different materials, and the first and second rams 71 and 72 may move at different speeds and apply different pressures. The above molding materials or the ram speeds and the ram pressures may exert an influence on the locations or shapes of the seam line splitting planes 10-3 and 10-4, and may be optimally designed in consideration of process environments, product characteristics, etc.

Figure 8:
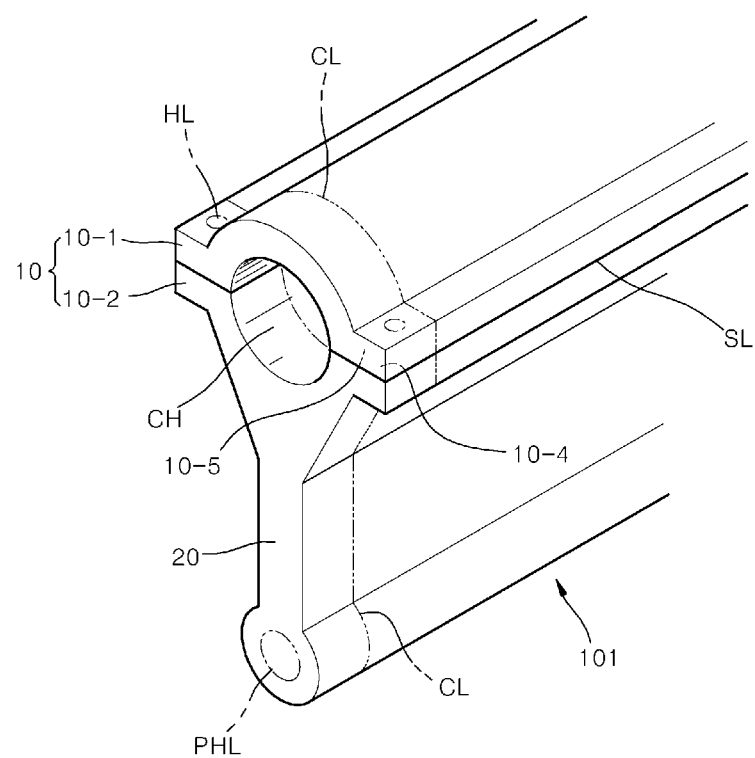
FIG. 8 is a perspective view showing a cutting line of the extrusion base material of FIG. 7.
Figure 9:
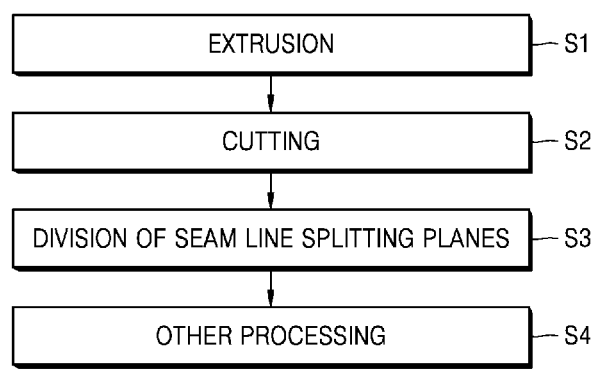
FIG. 9 is a flowchart of a method of manufacturing an extrusion-type connecting rod, according to some embodiments of the present invention.

FIG. 7 is an operational perspective view showing the extrusion base material 101 extruded using the connecting rod extrusion apparatus 1000 of FIG. 3, FIG. 8 is a perspective view showing a cutting line CL of the extrusion base material 101 of FIG. 7, and FIG. 9 is a flowchart of a method of manufacturing an extrusion-type connecting rod, according to some embodiments of the present invention.

As illustrated in FIGS. 7 to 9, the extrusion-type connecting rod manufacturing method according to some embodiments of the present invention is a method of manufacturing the extrusion-type connecting rod 100 using the above-described connecting rod extrusion apparatus 1000, and may include extruding the extrusion base material 101 by penetrating the molding material M through the first and second inlet holes 50-1 and 50-2 and the final extrusion hole 40-1 (S1), cutting the extrusion base material 101 along the cutting line CL into an individual connecting rod (S2), dividing the seam line splitting planes 10-3 and 10-4 of the cut individual connecting rod (S3), and boring the fixture holes 2 of FIG. 1 along fixture hole lines HL in the first and second big ends 10-1 and 10-2 in such a manner that the first and second big ends 10-1 and 10-2 divided along the seam line splitting planes 10-3 and 10-4 are assembled with each other, and boring the piston pinhole PH of FIG. 1 along a piston pinhole line PHL in the small end 30 (S4).

In the dividing of the seam line splitting planes 10-3 and 10-4 of the cut individual connecting rod (S3), since connection between the seam line splitting planes 10-3 and 10-4 is very weak, a user may easily divide the seam line splitting planes 10-3 and 10-4 by applying a small impact therebetween using a hammer, a clamp, or the like without an additional cutting device or a cutting tool.

Although the dividing of the seam line splitting planes 10-3 and 10-4 (S3) or the boring (S4) is performed after the cutting along the cutting line CL (S2) for convenience of processing, the dividing of the seam line splitting planes 10-3 and 10-4 (S3) may be performed first and then the cutting along the cutting line CL (S2) or the boring (S4) may be performed.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A connecting rod extrusion apparatus comprising:
   a front die having one final extrusion hole provided in an external shape of a connecting rod; and
   a rear die assembled with the front die and comprising:
      a crankshaft hole generator for generating a crankshaft hole of the connecting rod;
      one or more bridges provided on the crankshaft hole generator to generate seam line splitting planes based on the crankshaft hole generator;
      at least one first inlet hole provided in a first direction based on the bridges; and
      at least one second inlet hole provided in a second direction based on the bridges.

2. The connecting rod extrusion apparatus of claim 1, wherein the crankshaft hole generator protrudes to be spaced apart from and partially inserted into the final extrusion hole of the front die.

3. The connecting rod extrusion apparatus of claim 1, further comprising:
   a container assembled with the rear die and having one container hole; and
   a ram for extruding a molding material accommodated in the container hole, toward the front die.

4. The connecting rod extrusion apparatus of claim 1, further comprising:
   a container assembled with the rear die and comprising a first container hole connected to the first inlet hole and a second container hole connected to the second inlet hole;
   a first ram for extruding a first molding material accommodated in the first container hole, toward the front die; and
   a second ram for extruding a second molding material accommodated in the second container hole, toward the front die.

* * * * *